No. 807,349. PATENTED DEC. 12, 1905.
F. BEASLEY.
CULTIVATOR.
APPLICATION FILED AUG. 23, 1905.
2 SHEETS—SHEET 1.
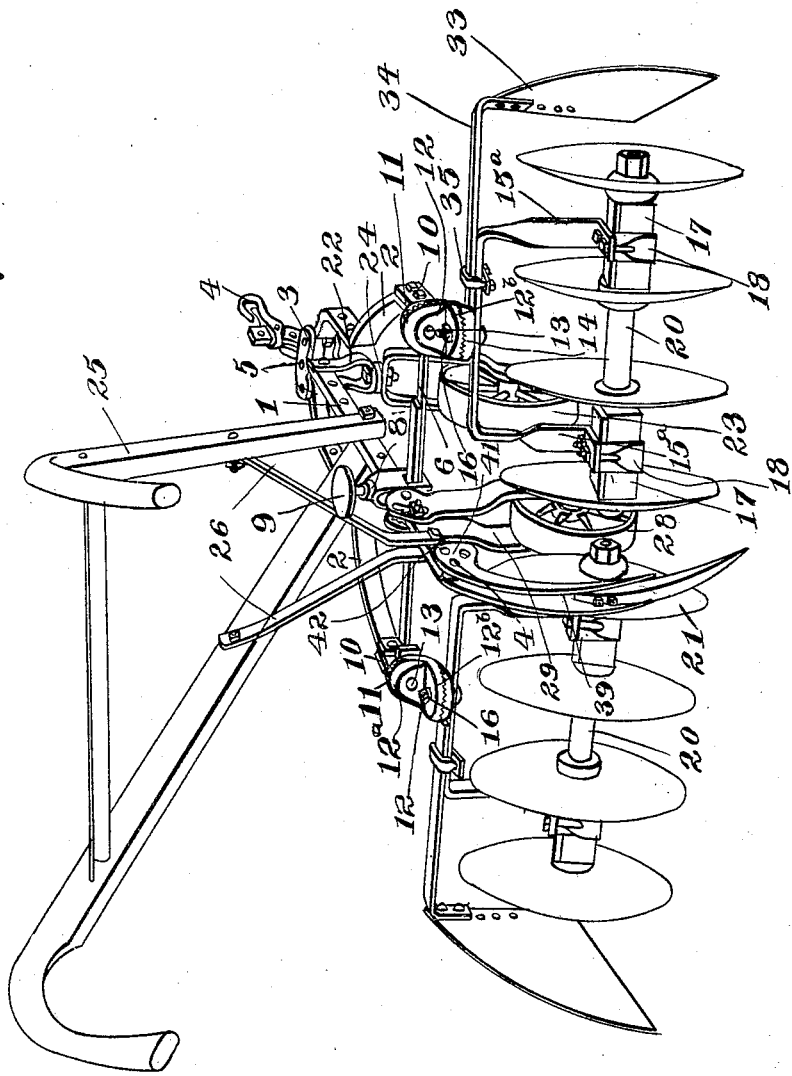
Inventor
F. Beasley.
Witnesses
By ......., Attorneys

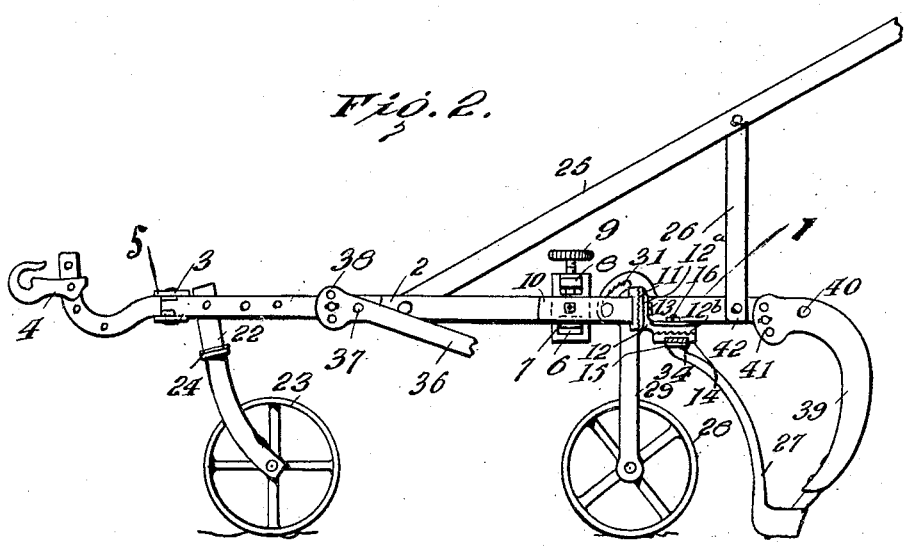
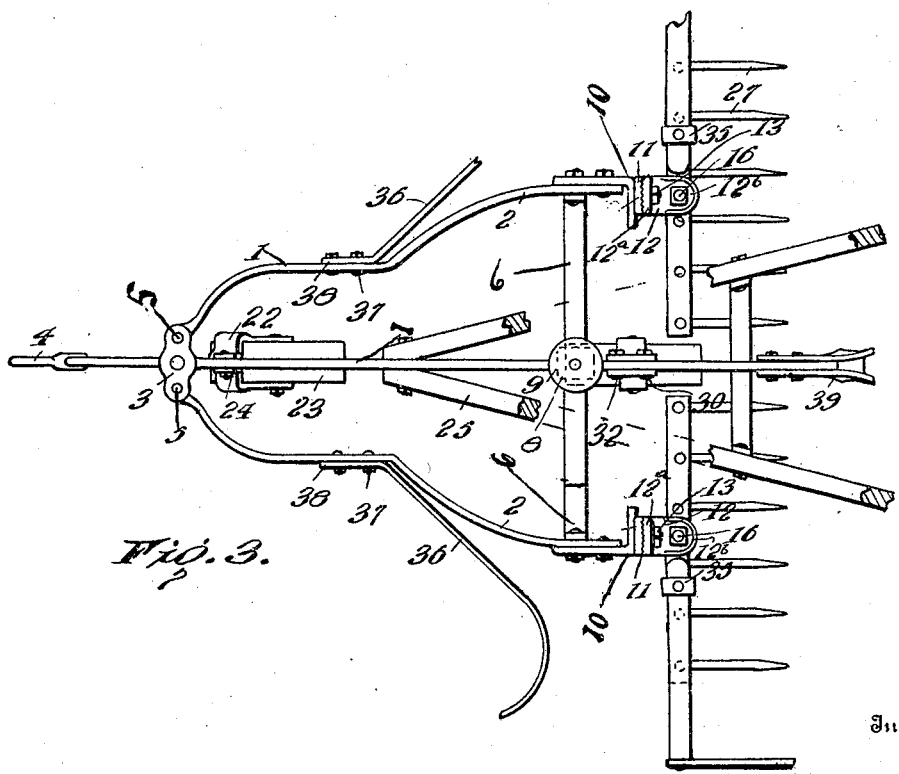

UNITED STATES PATENT OFFICE.

FRANK BEASLEY, OF LYONS, NORTH CAROLINA.

CULTIVATOR.

No. 807,349. Specification of Letters Patent. Patented Dec. 12, 1905.

Application filed August 23, 1905. Serial No. 275,446.

*To all whom it may concern:*

Be it known that I, FRANK BEASLEY, a citizen of the United States, residing at Lyons, in the county of Granville and State of North Carolina, have invented certain new and useful Improvements in Cultivators, of which the following is a specification.

For a full description of the invention and the merits thereof and also to acquire a knowledge of the details of construction of the means for effecting the result reference is to be had to the following description and accompanying drawings, in which—

Figure 1 is a perspective view of a cultivator embodying the invention. Fig. 2 is a side elevation of the invention, cultivating-teeth being substituted for the disks shown in Fig. 1. Fig. 3 is a top plan view of the cultivator, the handles being shown broken away.

Corresponding and like parts are referred to in the following description and indicated in all the views of the drawings by the same reference characters.

This invention embodies improvements in agricultural implements and relates particularly to a novel form of gang-cultivator.

In the practical embodiment of the invention a cultivator constructed in accordance therewith embodies a frame comprising the longitudinal beam 1 and the side bars 2. A coupling member 3 at the front end portion of the beam, near a suitable clevis 4, admits of pivotal connection at 5 of the side bars 2 of the frame of the implement. It is designed that the cultivator shall carry two gangs of cultivating disks, teeth, or shovels of suitable form, and in order that each gang may be adjusted with relation to the adjacent gang the frame of the cultivator is adapted to be expanded. In other words, the pivotal connection of the members 2 with the beam 1 of the frame admits of moving said members 2 toward and from the beam. Transverse bars 6 are connected at the outer ends thereof with the side bars 2 of the frame of the cultivator, and the inner end portions of said bars 6 are received by openings 7 in the sides of a yoke 8, which straddles the beam 1 near the rear end portion thereof. A hand adjusting-screw 9 is mounted in the upper portion of the yoke 8, and the lower end of said screw is adapted to bear against the upper edge portion of the beam 1, so as to raise the yoke and cause the bars 6 passing through the sides of the yoke beneath the beam 1 to be clamped hard against the beam and held rigidly at a predetermined adjustment. Adjustment of the bars 6 will adjust the positions of the side bars 2 of the frame of the implement, and as said side bars 2 each carry a gang of cultivating disks or teeth it will be seen that the gangs may be adjusted so as to position a greater or less distance apart. L-shaped plates 10 are attached to the rear extremities of the side bars 2 of the frame of the implement, and the rear ends of the plates 10 have the disks 11 secured thereto. The disks 11 are provided upon the outer sides thereof with circularly-arranged teeth adapted to engage similar teeth on a vertical wing $12^a$ of an angle-plate 12, a bolt or similar fastening 13 being used to secure the wing $12^a$ of the plate 12 to the disk 11, said fastening 13 passing through the central portions of these parts. The horizontal wing $12^b$ of the plate 12 is provided on its under side with teeth similar to those carried by the wing $12^a$, and the teeth of the wing $12^b$ are adapted to interlock with similar teeth on a disk 14, which is secured to a frame 15.

It will be understood that one of the frames 15 is arranged at the rear end of each bar 2, and said frames 15 are secured to the horizontal wings of the plates 12 by means of the vertical bolts 16, the latter passing through the disks 14, the frames 15, and the said horizontal wings of said plates 12. As shown in Fig. 1, the frames 15 are of somewhat U form, the sides $15^a$ thereof having boxings 17 attached thereto by clamps 18, and these boxings have axles 20 mounted therein. The axles 20 carry a plurality of disks 21, the disks carried by one axle facing in the direction opposite to those carried by another. It will be noted that each frame 15 thus carries a gang of disks 21, so that said frames 15 may be termed "gang-frames." Further, the connection between the gang-frames 15 and the rear ends of the bars 2 is such that the frames 15 may be adjusted about a vertical axis comprised in the bolts 16 and also about a horizontal axis comprised in the bolts 13. The above permits of adjustment of the positions of the disks 21, inclining from the vertical or from the horizontal, or both, and this is of no small advantage, for reasons which will be obvious to those conversant with the art to which the invention relates.

A yoke 22 is secured adjustably to the front end portion of the beam in rear of the coupling member 3, and a caster-wheel 23 is swiveled to the yoke 22, as shown at 24. The caster-wheel 23 supports the front end portions of the frame of the implement in an obvious manner, and said wheel is adapted to turn readily as the implement turns at the end of the furrows. Handles 25 extend upwardly from the beam 1 and are braced, as shown at 26.

In order to regulate the depth of the cutting action of the disks 21 or of the teeth 27, (shown in Fig. 2,) it is designed that the rear portion of the frame of the implement be also supported by means of a caster-wheel 28, and the standard 29, which carries said wheel 28, is composed of spaced parts embracing the beam 1 upon opposite sides and pivoted thereto, as shown at 30. The spaced parts of the standard 29 are provided with arcuate slots 31, formed on an arc generated from the pivot 30 as a center, and the slots 31 admit of passage of a bolt 32 through both the beam and the spaced parts of the standard 29 to position the standard 29 at a predetermined adjustment, and thereby hold the wheel 28 in an adjusted position, permitting the members 21 or 27 to cut at a desired depth.

As shown in Fig. 1, it is contemplated that each of the gang-frames 15 shall support a fender-plate 33, this plate being disposed in spaced relation to the outermost disk 21 of each gang carried by the axles 20. The plate 33 is supported by a horizontal bar 34, one of which is attached to each frame 15 by means of a suitable fastening, (indicated at 35.) The plates 33 are provided with a plurality of openings through which the fastening may pass, securing said plates to the bars 34, and the said openings admit of adjustment of such fastening to hold the plates 33 in an adjusted position, as preferred. The plates 33 are designed to protect small plants by catching the dirt from the disk adjacent, preventing this dirt from covering up such plants.

As shown in Fig. 3, fender-bars 36 are adjustably secured, as shown at 37, to the side bars 2, and each of the fender-bars 36 curves outwardly and rearwardly from opposite sides of the frame of the implement, said bars being used to deflect or push vines or branches of plants—such as sweet potatoes, peanuts, or the like—out of the way, so that the same will not be injured by the dirt thrown by the cultivator or plow or by the cultivating disks or teeth themselves. It is contemplated that both the fender-plates 33 and the fender-bars 36 may be dispensed with according to the necessities arising from actual conditions of service. The front extremities of the fender-bars 36 have a plurality of openings 38 therein, said openings being arranged on an arc with the pivots 37 as a center, and suitable fastenings may be passed through the openings 38 and the adjacent side bars 2 to position the fender-bars 36 at a predetermined adjustment.

An adjustable standard 39 is secured to the rear extremity of the beam 1, having pivotal connection at 40 and provided with arcuately-arranged openings 41, through which a fastening 42 is adapted to pass to adjust the standard 39, said fastening also passing through the beam 1 for this purpose. The standard 39 is adapted to carry a tooth which, operating at the rear end of the implement and located exactly between the two gangs of cultivators supported by the gang-frames 15, will form a cut between the rows operated upon by the gangs of cultivators, this enabling the plowman to direct the implement more readily in an evident manner. The standard 39 may be readily displaced and the standard 29 of the wheel 28 may be secured in the position previously had by the said standard 39; but in this instance the wheel 28 will operate in rear of the gangs of cultivators instead of in front, as shown in Figs. 1 and 2.

When the teeth 27 (shown in Fig. 2) are used, the same will be secured to a gang-frame of bar 43, and any number of the teeth 27 may be applied thereto as found necessary or desirable in actual use of the implement.

Having thus described the invention, what is claimed as new is—

1. In a cultivator of the class described, the combination of a frame embodying side bars, gang-frames carried by the rear end portions of said side bars, a gang of cultivating members carried by said gang-frames, and fender-plates arranged upon the outer side of the outermost cultivating member of each gang-frame and supported by the adjacent gang-frame.

2. In a cultivator of the class described, the combination of a frame embodying side bars, gang-frames carried by the rear end portions of said side bars, a gang of cultivating members carried by said gang-frames, and fender-bars adjustably attached to the side bars of the frame and curving rearwardly and outwardly therefrom in advance of the cultivating members of the gang-frames.

In testimony whereof I affix my signature in presence of two witnesses.

FRANK BEASLEY. [L. S.]

Witnesses:
LAURA TILLEY,
GRACIA TILLEY.